United States Patent
Rodriguez (10) Patent No.: US 10,371,399 B1
(45) Date of Patent: Aug. 6, 2019

(54) SMART VENTS AND SYSTEMS AND METHODS FOR OPERATING AN AIR CONDITIONING SYSTEM INCLUDING SUCH VENTS

(71) Applicant: Carlos Rodriguez, Santa Ana, CA (US)

(72) Inventor: Carlos Rodriguez, Santa Ana, CA (US)

( * ) Notice: Subject to any disclaimer, the term of this patent is extended or adjusted under 35 U.S.C. 154(b) by 1161 days.

(21) Appl. No.: 13/830,840

(22) Filed: Mar. 14, 2013

Related U.S. Application Data (60) Provisional application No. 61/611,521, filed on Mar. 15, 2012.

(51) Int. Cl.
| | |
|---|---|
| *F24F 3/00* | (2006.01) |
| *F24F 11/00* | (2018.01) |
| *F24D 19/10* | (2006.01) |
| *G05D 23/275* | (2006.01) |
| *F24F 7/00* | (2006.01) |
| *F24F 11/30* | (2018.01) |
| *F24F 11/74* | (2018.01) |
| *F24F 11/70* | (2018.01) |
| *F24F 120/10* | (2018.01) |
| *G05D 23/19* | (2006.01) |

(52) U.S. Cl.
CPC .............. *F24F 11/30* (2018.01); *F24F 11/70* (2018.01); *F24F 11/74* (2018.01); *F24F 2120/10* (2018.01); *G05D 23/1934* (2013.01)

(58) Field of Classification Search
CPC .............. G05D 23/1934; F24F 11/0034; F24F 11/0035; F24F 11/0036; F24F 11/74
USPC .................... 263/49.3, 1 B; 165/208, 237
See application file for complete search history.

(56) References Cited

U.S. PATENT DOCUMENTS

| | | | |
|---|---|---|---|
| 4,294,404 A | | 10/1981 | Gajjar |
| 4,671,458 A | | 6/1987 | Fukuda et al. |
| 4,723,593 A | * | 2/1988 | Kuribayashi ........ F24F 11/0009 165/11.1 |
| 5,119,987 A | | 6/1992 | Kobayashi |
| 5,180,333 A | * | 1/1993 | Shyu ........................ F24F 11/00 236/49.3 |
| 5,395,042 A | | 3/1995 | Riley et al. |

(Continued)

FOREIGN PATENT DOCUMENTS

| | | |
|---|---|---|
| EP | 0341022 A2 | 11/1989 |
| EP | 1985936 A1 | 10/2008 |

(Continued)

OTHER PUBLICATIONS

Translation of Korean Patent Document KR 20110020065 A entitled Translation—KR 20110020065 A, translated Jul. 2016.*

*Primary Examiner* — Paul Alvare
(74) *Attorney, Agent, or Firm* — William A. English; Vista IP Law Group LLP (57) ABSTRACT

Systems and methods are provided for operating a central air conditioning and/or heating system within a building that includes one or more blowers and ducts communicating from the blower(s) to respective rooms within the building. The system includes a vent in each of the rooms including an actuator for selectively opening and closing the vent, one or more sensors in each room for detecting occupants, and a controller communicating with the actuators and the one or more sensors for directing the actuators to open or close respective vents based at least in part on data from the one or more sensors.

8 Claims, 7 Drawing Sheets

(56) References Cited

U.S. PATENT DOCUMENTS

| | | | |
|---|---|---|---|
| 5,637,040 A | 6/1997 | Kim et al. | |
| 5,815,078 A | 9/1998 | Mun et al. | |
| 6,840,852 B2 * | 1/2005 | Gehring | B60H 1/3414 454/153 |
| 2006/0071087 A1 * | 4/2006 | Kates | F24F 11/006 236/1 B |
| 2007/0298706 A1 * | 12/2007 | Hudon | F24F 11/04 454/256 |
| 2010/0025483 A1 * | 2/2010 | Hoeynck | F24F 11/001 236/1 C |
| 2010/0063636 A1 * | 3/2010 | Matsumoto | F24F 11/0034 700/276 |
| 2011/0130881 A1 * | 6/2011 | Nanami | F24F 3/044 700/277 |
| 2011/0253796 A1 * | 10/2011 | Posa | F24F 11/0034 1/34 |
| 2011/0269389 A1 * | 11/2011 | Scharf | F24F 13/1426 454/258 |
| 2012/0012297 A1 * | 1/2012 | Nakagawa | F24F 11/0012 165/247 |

FOREIGN PATENT DOCUMENTS

| | | | |
|---|---|---|---|
| KR | 20110020065 A | * | 3/2011 |
| WO | 2010074330 A1 | | 7/2010 |

* cited by examiner

SMART VENTS AND SYSTEMS AND METHODS FOR OPERATING AN AIR CONDITIONING SYSTEM INCLUDING SUCH VENTS

RELATED APPLICATION DATA

This application claims benefit of provisional application Ser. No. 61/611,521, filed Mar. 15, 2012, the entire disclosure of which is expressly incorporated by reference herein.

FIELD OF THE INVENTION

The present invention relates to systems and methods for controlling, automating, and/or operating climate control systems, e.g., within a residence or other building. In addition, the present invention relates to ventilation devices for use with such systems and methods.

BACKGROUND

Heating and cooling a home is one of the largest energy expenditures in most households throughout the U.S., frequently accounting for over half of energy bills. Often times, thermostats are not located in the ideal position within a home, leaving major temperature variances between rooms. Some other obstacles that may lead to inefficiency of home cooling or heating systems include different room sizes, various distances between each room and the central air system, sunlight exposure to a room, and population of a room.

Within a household, the rooms that are farthest from the central air system may receive little air flow when compared to other rooms. For example, the farthest room from the central air system may be warmer in summer and colder in winter than the rest of the household due to reduced airflow.

Therefore, systems and methods for improving operation of AC or heating systems would be useful.

SUMMARY

The present invention is directed to systems and methods for controlling, automating, and/or operating climate control systems, e.g., within a residence or other building. In addition, the present invention relates to ventilation devices for use with such systems and methods.

The purpose of the systems and methods herein are to bring a higher level of control, efficiency, and/or automation to climate control systems, e.g., conventional central air conditioning and/or heating systems. To accomplish this, novel air conditioning systems, methods, and related technology for homes or other buildings are provided herein. With the new system, each vent in the household or building may be networked through one or more wired or wireless connections, e.g., networked to a central controller or other control system. The central controller may be located in a central location in the building, e.g., in close proximity to the central air system or thermostat, and have the capability of signaling the building's existing thermostat.

The systems herein may be added to an existing central air system or may be incorporated into a new central air system. For example, in one embodiment, the central controller may be installed to communicate with an existing central air system, e.g., such the central controller communicates with an existing control system for the central air system. Alternatively, the central controller may replace an existing control system while other components of the existing central air system may remain. In either alternative, new "smart" vents may replace any existing vents to allow communication and/or operation based on the systems and methods herein.

Another aspect of the system is an improved "smart" vent, which may be provided with independently controllable fins, e.g., able to move in two axes of motion, for example, both vertically and horizontally. This may give the vent the ability to direct airflow in any direction, e.g., having cycling patterns to substantially uniformly cool a large room, and/or aiming air flow directly at heat sources in the room (e.g., people). Optionally, the smart vent may also have the capability of closing itself off completely, e.g., enabling the user and/or control system to substantially seal off one or more rooms from the ducts communicating with the vents. In addition or alternatively, each smart vent may also be fitted with an infrared thermal camera, capable to determine the temperature in different locations throughout the room and/or recognize body shaped heat signatures in each room.

The smart vent devices and systems disclosed herein may have the capability of addressing one or more of the problems with conventional AC systems. For example, with the smart vent, instead of treating an entire home as a unit and attempting to cool it down to one uniform temperature, the user may have the capability of improving operation of the system by treating each individual room as a separate environment. Each vent may be in substantially continuous or intermittent, e.g., periodic, communication with a control system, which may serve as one or both of a power source and a communication line.

An exemplary time to use the smart vent would be when there is only one person present working in a single room, e.g., a home office, throughout the day. Instead of substantially continuously running the AC system to cool the entire building, hoping to gradually cool the occupied space, e.g., which may cause other rooms in the building to become excessively cold, the smart vent systems and methods herein (e.g., operated by a local controller or by a portable electronic device, such as a smart phone) may shut off other, e.g., all, vents throughout the building and only cool the occupied room. Such action may drastically increase the output of air flow to the occupied room since the AC system only needs to cool one room as opposed to the whole building. Once the occupied room is cooled to a desired temperature, an infrared thermal camera and/or other sensor may determine the temperature of the occupied room, send a signal back to the system controller and turn off the AC system.

A system including such a smart vent may effectively place a thermostat in every room or area of a household or other building. The smart vent may also have the capability of setting temperature ranges for rooms that are on standby to keep the rest of the building at a comfortable temperature. For example, when providing air conditioned air to cool the rooms, the user may set active rooms to seventy degrees (70°) and rooms on standby to eighty degrees (80°). Using a system as disclosed herein, it may be possible to have different rooms in the building set to different temperatures by effectively dosing the cold air and adjusting the temperature little by little.

The smart vent may also have the capability of working by percentages. For example a user may set one hundred percent (100%) flow to the family room while company is over, and twenty percent (20%) flow to the rest of the bedrooms to keep them comfortable. If the user wishes to go into a room that has previously been shut off to all AC and is now warmer than usual, the smart vent system may also has the capability of momentarily shutting off the rest of the house to rapidly bring the new room down to the proper temperature relatively quickly.

Another practical use for the system may be partitioning off upstairs areas or rooms from downstairs areas or rooms while sleeping, e.g., during summer nights. The user may have the ability to directly cool air flow to bedrooms in which family members are sleeping and deliver substantially reduced or no air to the downstairs area while no one is using it.

Another possible useful function of the smart vent system is auto mode function. In this mode, the vent and sensors may have the capability of knowing a user's location in the house at any given time, predicting the odds of whether a nearby room needs to be cooled or not, and automatically adjusting as the system sees fit.

All of the functions described herein may also be available for heating a cold home in the winter time, as well as cooling a hot home in the summer time. In addition, on a larger scale, the systems and methods herein may have applications for large businesses and universities. Using smart vent systems, schools may not need to spend energy cooling or heating empty classrooms at hours when only a couple of classrooms are being used. On this scale, the amount of money in energy savings may be dramatic.

As described elsewhere herein, the systems and methods herein may provide one or more of the following features:
  Set different rooms to different temperatures by dosing cold air flow;
  Stop wasting energy cooling unoccupied rooms;
  Provide ability to direct the full force of an AC system into one room to rapidly lower the temperature;
  Provide thermal cameras associated with each smart vent that detect heat signatures, e.g., corresponding to occupants of each room, providing data to a controller, which may operate the smart vents to intelligently direct cold air flow towards the hottest parts of each occupied room;
  Set temperature ranges for standby rooms, e.g., that are higher than occupied rooms;
  Provide modular construction easily repairable vent constructions;
  Provide cooling by percentages;
  Include a mobile application to set temperature from work or other remote location, e.g., communicating with the central controller via a telecommunications or other network, e.g., a telephony network, the Internet, and the like;
  Partition off upstairs from downstairs or otherwise divide a building into different zones conditioned under different parameters;
  Optionally, motion sensors may be substituted for thermal cameras and communicate data to the controller to indicate when rooms are occupied or vacant;
  For wired connection, wires may be provided through existing duct system, which may provide a simple clear path, for communication and/or power between the vents and the controller;
  Ability to intelligently aim cold air at heat source(s) in rooms;
  Programmable cycling patterns to increase efficiency;
  Experiment with air flow designs fluid dynamics;
  Optionally, one or more solar cells may be provided on the building to provide electrical power to controller unit, e.g., to reduce or eliminate additional energy needs for the system;
  Cycle patterns to cool large rooms; and/or
  Optionally, additional Wi-Fi sensors may be added, e.g., in outlets to wall plugs in desired rooms if desired, in addition to or instead of cameras or sensors in the vents themselves.

In accordance with one embodiment, a system is provided for operating a central air conditioning and/or heating system within a building that includes one or more blowers and ducts communicating from the blower(s) to respective rooms within the building that includes a vent in each of the rooms comprising an actuator for selectively opening and closing the vent; one or more sensors in each room for detecting occupants; and a controller communicating with the actuators and the one or more sensors for directing one or more the actuators to open or close respective vents based at least in part on data from the one or more sensors.

In accordance with another embodiment, a vent for an air conditioning system is provided that includes a frame mountable to a wall; first and second sets of fins pivotally mounted to the frame; an actuator coupled to the first and second sets of fins for moving the sets of fins about two axes of motion; and a sensor for detecting occupants within a room within which the vent is mounted.

In accordance with still another embodiment, a method is provided for delivering conditioned air into a room of a building from a central air system via a vent mounted in the room. Generally, the method includes acquiring data from a sensor on the vent to determine that a person has entered the room. When the sensor data indicates that a person has entered the room, after a predetermined time period, data may be acquired from the sensor to confirm that the person remains in the room. When the sensor data confirms that the person remains in the room, data may be acquired from the sensor to determine a current temperature within the room, and the current temperature may be compared to a desired occupancy temperature to determine whether conditioned air is needed to bring the current temperature to the desired occupancy temperature. When the comparison confirms that conditioned air is needed, the vent may be opened and/or the central air system activated to deliver conditioned air from the central air system into the room.

Periodically, data may be acquired from the sensor confirming whether the person remains in the room, and/or whether conditioned air is still needed to bring the current temperature to the desired occupancy temperature. When the sensor data indicates that the person has left the room and/or sufficient air has been delivered such that the current temperature has reached the desired occupancy temperature, air delivery may be discontinued.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figure 1:
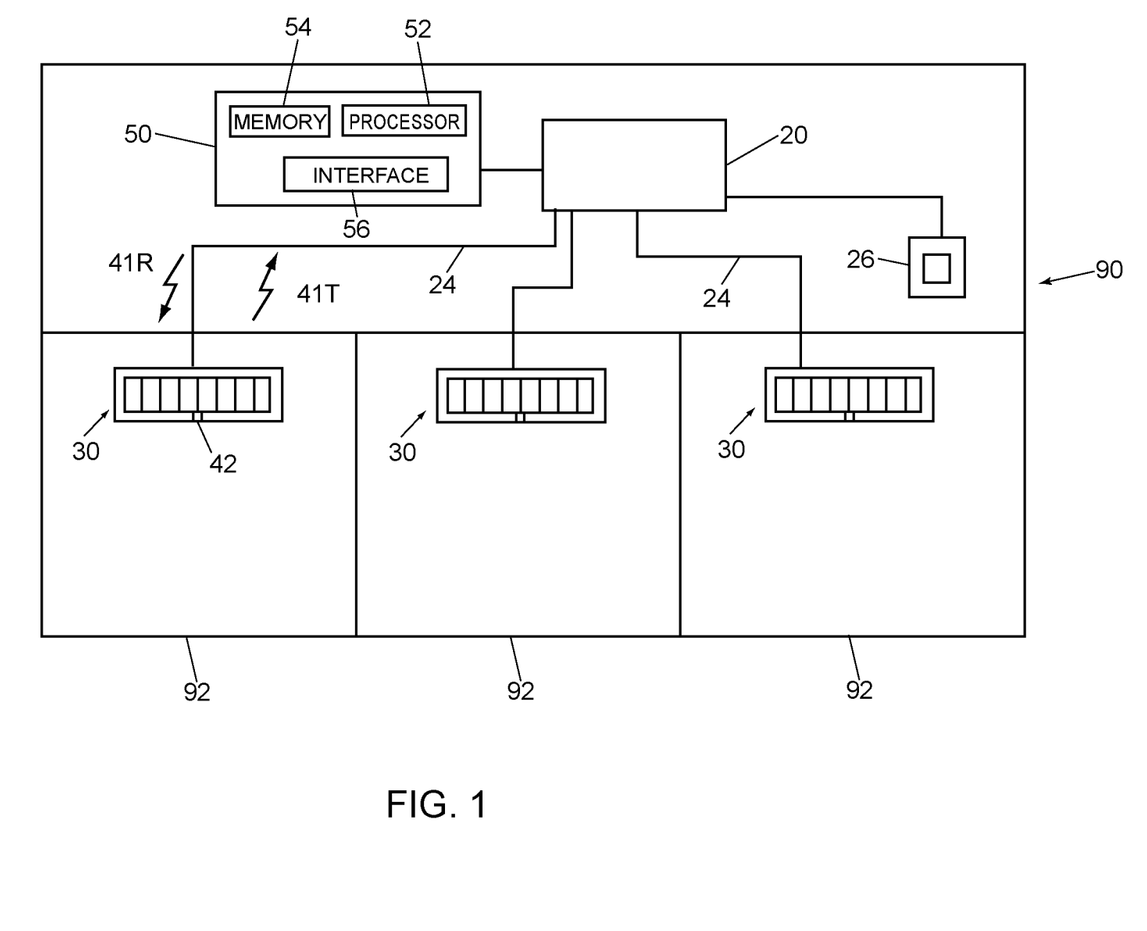
FIG. 1 is a schematic showing an exemplary embodiment of an air conditioning/heating system.

Turning to the drawings, FIG. 1 shows an exemplary embodiment of an air conditioning/heating system 10 for cooling and/or heating a building structure 90, such as a home, including multiple rooms 92. Although the systems and methods herein may have particular application in homes, e.g., single family homes, condominiums, town houses, and other residences having their own AC systems, they may also be used in commercial and/or industrial buildings, or areas of such buildings that include separate zones or AC systems that service multiple rooms.

Generally, the system 10 includes a central air system 20, a plurality of vents 30 capable of receiving air from the central air system 20 via a plurality of ducts 24, and a central controller 50 coupled to the central air system 20 and communicating with the vents 30. Optionally, the system 10 may also include one or more remote and/or portable electronic devices 60 for communicating with the central controller 50, e.g., via a network 70, as described further below.

The central air system 20 includes one or more blowers, fans, and the like configured to deliver conditioned air to the rooms 92 via the ducts 24 and vents 30. In addition, the central air system 20 may include one or more additional conventional components, e.g., condensers, compressors, heating or cooling elements, humidifiers, dehumidifiers, filters, and the like for conditioning the air delivered in a desired manner, e.g., heating during relatively cold weather and/or cooling during relatively hot weather. The ducts 24 may include any conventional components for conveying conditioned air from the central air system 20 to the vents 30. In addition, the central air system 20 may include a central thermostat 26 located at a predetermined location within the building 90.

In an exemplary embodiment, the central air system 20, duct system 24, and thermostat 26 may be part of an existing system within the building 90. For example, the central controller 50 and vents 30 may replace similar existing components, or the central controller 50 may be configured to communicate with an existing controller (not shown) of the central air system 20. Alternatively, the central air system 20 may also be new, e.g., incorporating the central controller 50, and only an existing duct system 24 and thermostat 26 may remain from a previous system. In a further alternative, all of the components of the system 10 may be new, e.g., part of a new construction of a building or build-out of a previously unoccupied space of a building, or a remodel of an existing building. In this alternative, it may be possible to omit the thermostat 26 and operate the central controller 50 based only on communicating with the vents 30.

As shown in FIG. 1, the central controller 50 generally includes one or more processors 52, memory 54 accessible by the processor 52, and one or more communication interfaces 56 for communicating between the processor(s) 52 and one or more other devices, e.g., the central air system 20, the vents 30, and/or the electronic device 60. The processor(s) 52 may control operation of the central air system 20, e.g., to turn the central air system 20 on and off, to adjust parameters of the air conditioned by the central air system 20, e.g., to increase or decrease temperature of the conditioned air delivered via the ducts 24, and the like. Alternatively, the processor(s) 52 may interface with an existing controller (not shown) of the central air system 20, e.g., to operate the vents 30 based on existing parameters of the central air system 20, as described elsewhere herein.

In exemplary embodiments, the communications interface 56 may include one or more wired or wireless interfaces. For example, the central controller 50 may be coupled to the central air system 20 by one or more cables, wires, leads, and the like, e.g., for controlling operation of the central air system 20. In this embodiment, the interface 56 may simply convert signals between easily transmitted over-the-wire signals to signals that may be interpreted by the central controller 50 and/or central air system 20, e.g., analog or digital, and/or DC or AC. Optionally, the central controller 50 may be coupled directly to the existing thermostat 26, e.g., by a wired or other connection, or may receive information indirectly from the thermostat 26 via the central air system 20, e.g., via an existing controller.

In addition, the communications interface 56 may include a wireless transmitter and/or receiver for communicating with the vents 30. In an exemplary embodiment, the interface 56 may include a radiofrequency (RF) transceiver, e.g., using Bluetooth or other communications protocols, to receive data from the vents 30 and/or communicate commands to the vents 30, as described further elsewhere herein. Alternatively, the central controller 50 may communicate with the vents 30 via one or more cables, wires, leads, and the like (not shown), e.g., similar to the central air system 20. In a further alternative, the central controller 50 and vents 30 may communicate via the network 70, e.g., by assigning unique IP addresses to each of the central controller 50 and the vents 30, and using Internet or other protocols to provide data to the central controller 50 and/or commands to the vents 30, as described elsewhere herein.

As shown in FIG. 1, the central air system 20 and controller 50 may be located at a desired location within the building 90, e.g., within an attic 94 or other central location. It will be appreciated that other components of the central air system 20 may be provided at other locations, e.g., outside the building 90, and the like.

The central controller 50 may also communicate with the electronic device 60 via the network 70, e.g., using Internet or other protocols, to allow a user to modify and/or otherwise control operation of the system 10 remotely, as described elsewhere herein. Alternatively, the central controller 50 may communicate with the electronic device 60 directly using short range RF signals, e.g., when the electronic device 60 is present within or otherwise sufficiently near the building 90.

Figure 2A:
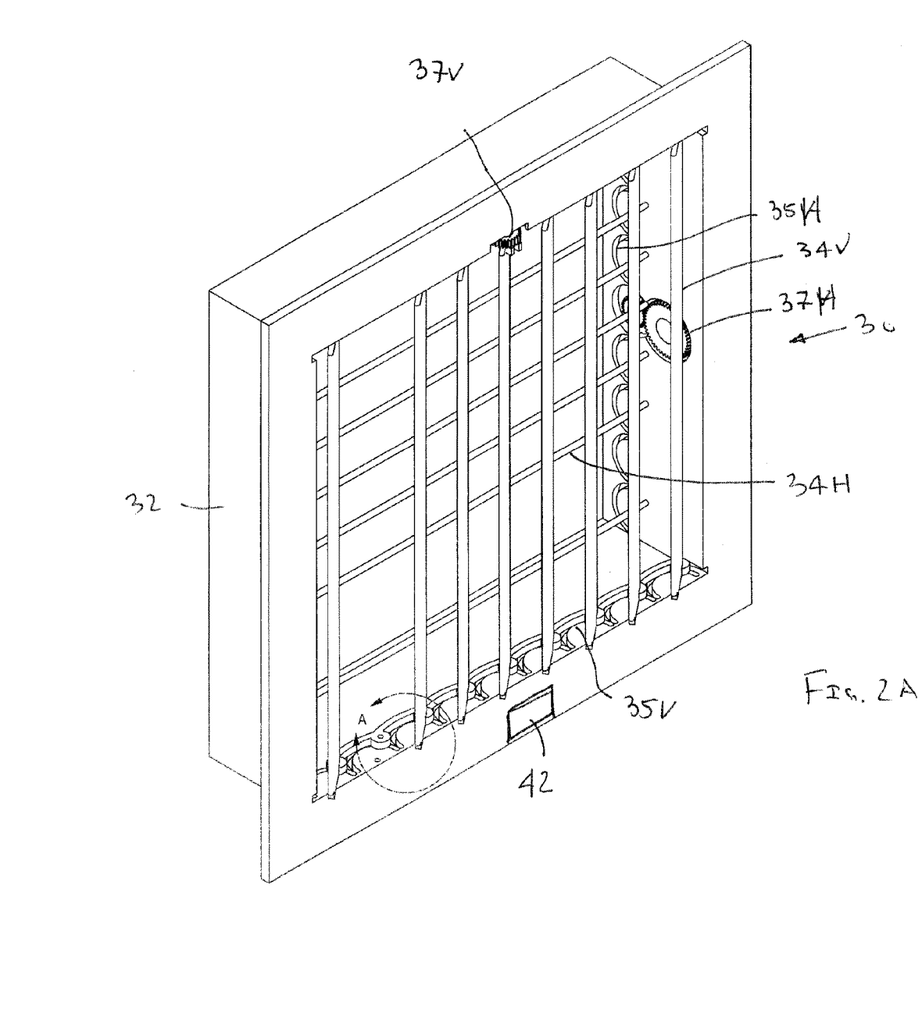
FIGS. 2A and 2B are perspective views of an exemplary embodiment of a vent that be mounted in a wall of room for delivering air from an air conditioning/heating system, such as that shown in FIG. 1.
Figure 2B:
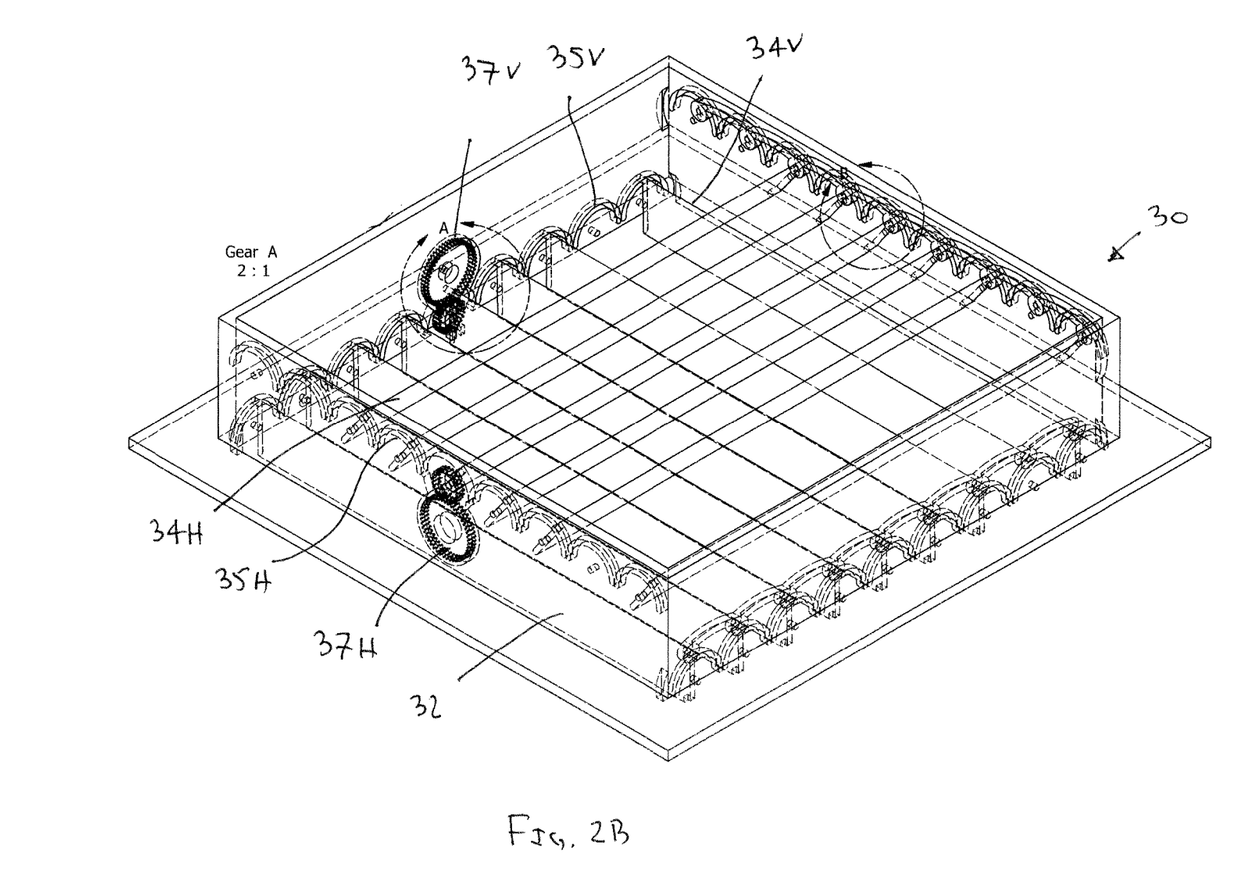
Figure 2C:
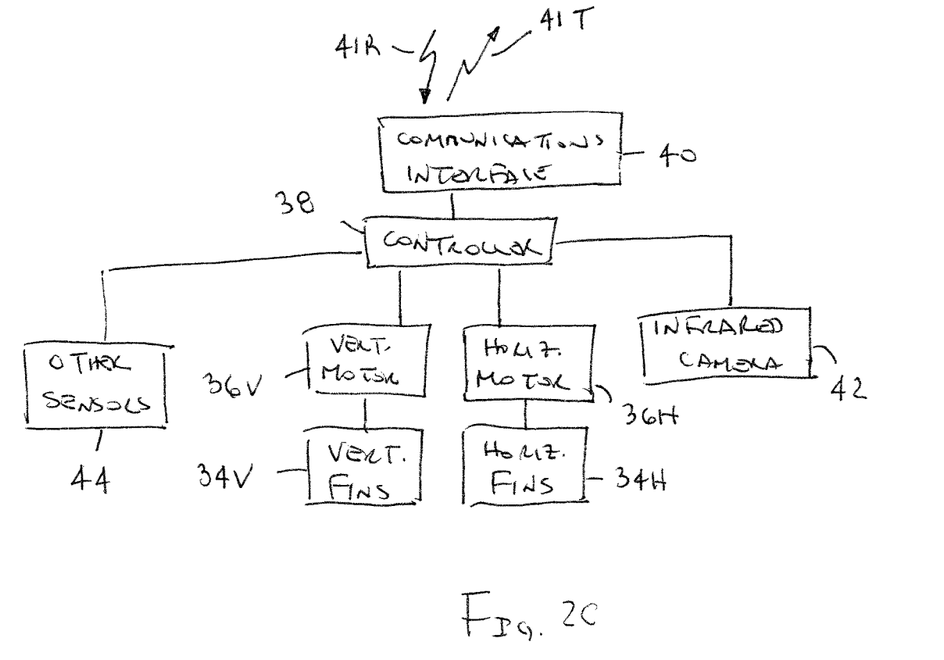
FIG. 2C is a schematic of an exemplary embodiment of a vent, such as the vent of FIGS. 2A and 2B, showing additional components of the vent.

Turning to FIGS. 2A-2C, an exemplary embodiment of a "smart" vent 30 is shown that may be used for any (e.g., all) of the vents 30 of the system 10 of FIG. 1. As shown, the vent 30 generally includes a frame 32 supporting a plurality of fins 34, one or more actuators 36 coupled to the fins 34, one or more processors or controllers 38, a communications interface 40, an infrared camera or sensor 42, and, optionally, one or more additional sensors 44.

As shown in FIGS. 2A and 2B, the vent 30 includes a set of vertical fins 34V and a set of horizontal fins 34H, which may be actuated to open and close the vent 30 and/or to control directional flow of air delivered through the vent 30. For example, the fins 34 may be configured to move between a zero percent flow configuration, e.g., substantially closed and/or sealed to minimize flow through the vent 30, and a one hundred percent flow configuration, e.g., in which the vent is opened to maximize flow through the vent 30. In addition, the fins 34 may be actuated to control direction of flow through the vent 30, e.g., allowing two dimensional direction of flow into the room within which the vent 30 is mounted. Alternatively, the vent 30 may include a separate valve or damper (not shown), e.g., within or behind the frame 32, which may be actuated to open or close flow through the vent 30 (to control overall flow rate), and the fins 34 may be actuated to control direction of flow into the room.

Optionally, the vent 30 may also include a grate or other cover (not shown), e.g., to provide a desired architectural finish for the vent 30 when seen from within the room where mounted, and/or to protect the fins 34 and/or other components of the vent 30. In addition or alternatively, the frame 32 may include peripheral flanges or other features, e.g., to facilitate mounting the vent 30 to a wall or other structure, to provide a desired finish, and the like. The components of the vent 30 may be formed from various materials, such as lightweight plastic, metal, composites, and the like, using conventional methods, e.g., extrusion, molding, machining, and the like. Optionally, the fins 34 may be lined or include flexible seals along their edges (not shown), e.g., formed from rubber, elastomeric, and/or other flexible material, e.g., to ensure a substantially air tight seal when the fins 34 are closed.

As shown in FIG. 2C, the vent 30 may also includes a pair of actuators 36 coupled to the fins 34, e.g., a low voltage servo or other motor having substantially quiet operation. For example, a separate motor 36V, 36H may be coupled to each set of fins 34V, 34H to independently open, close, or otherwise adjust each set of fins 34V, 34H. As shown in FIGS. 2A and 2B, each set of fins 34V, 34H may be coupled to respective pivoting racks 35V, 35H within the frame 32 that are coupled to a set of gears 37V, 37H. The gears 37V, 37H may be coupled, in turn, to the respective motor 36V, 36H (not shown, see FIG. 2C). Thus, operation of each of the motors 36 may cause the respective set of gears 35 to rotate, the racks 35 to pivot, and consequently the fins 34 to rotate and open or close. It will be appreciated that other arrangements, e.g., including one or both of vertical and horizontal fins, and/or other actuators may be provided for the vents 30 instead of that shown in FIGS. 2A-2C.

With continued reference to FIG. 2C, each vent 30 may include one or more processors or controllers 38 coupled to the motors 36, e.g., for controlling their operation, and/or one or more communications interfaces 40 (one of each shown for simplicity) for communicating with the central controller 50 of the central air system 20. For example, the communications interface 40 may include a wireless transmitter and/or receiver configured to transmit data to the central controller 50, e.g., image data from the infrared camera 42 and/or data from sensor(s) 44, and to receive instructions from the central controller 50.

In an exemplary embodiment, the processor 38 and interface 40 may receive raw data from the infrared camera 42, e.g., periodic temperature and/or image data, and process the data for transmission as data signals 41T to the central controller 50, which may further process the data to determine one or more conditions or parameters and operate the system 10 based at least in part on those parameters, as described elsewhere herein. For example, the processor 38 and interface 40 may merely convert raw data into a format for transmission, e.g., involving digital-to-analog conversion, compression, and the like, without otherwise processing or analyzing the data. In this manner, the capabilities of the processor 38 and interface 40 may be minimized, which may allow relatively low cost components to be used.

Alternatively, if bandwidth or other constraints limit the speed or size of data transmitted to the central controller 50, the processor 38 may at least partially process the data itself, e.g., analyze image or temperature data to determine one or more predetermined conditions or parameters. In this alternative, only the determined conditions or parameters may be transmitted to the central controller 50 in the data signals 41T.

In addition, the interface 40 may receive signals 41R, e.g., including commands or instructions, from the central controller 50 and extract and/or convert them into a format for use by the processor 38. For example, the interface 40 may extract instructions related to the desired orientation of the fins 34, which the processor 38 may use to actuate the motors 36 and move the fins 34, e.g., to control flow rate and/or direction of flow through the vent 30 into the room 92. For example, the instructions may simply be position parameters, which the processor 38 may use to actuate the motors 36 to position the fins 34 in a desired configuration, e.g., percentage open between zero and one hundred percent (0-100%), angle of the fins 34, e.g., between zero degrees (fully closed) and ninety degrees (fully open), and the like.

As shown in FIGS. 2A and 2C, the vent 30 also includes an infrared camera and/or other heat or temperature sensor 42 for acquiring data related to the room 92 within which the vent 30 is mounted. Optionally, the vent 30 may also include one or more other sensors 44 (not shown in FIG. 2A), e.g., a smoke detector, carbon monoxide sensor, a humidity sensor, and the like, as described elsewhere herein.

The heat sensor 42 may provide data related to the temperature within the room 92, which may be communicated in data signals 41T to the central controller 38 (via the processor 38, and interfaces 40, 56). In an exemplary embodiment, the processor 38 may periodically poll the heat sensor 42 to determine the temperature within the room 92 and communicate data signals 41T including the periodic temperature to the central controller 50. The data transmitted may simply be raw data from the heat sensor 42, which may be processed by the central controller 50, or the data may be at least partially processed by the processor 38, e.g., to determine an actual temperature value within the room 92 before transmission. If the heat sensor 42 is an infrared camera, the camera may simultaneously acquire temperature for several locations within the room 92, e.g., throughout the field of view of the camera. Such data may be combined, averaged, and/or otherwise processed, e.g., by the central controller 50 (once communicated) or by the processor 38.

In addition, the heat sensor 42 may provide additional information regarding conditions within the room 92, e.g., whether the room 92 is occupied, identifying heat sources, and the like. For example, if the heat sensor 42 is an infrared camera, it may acquire two dimensional images within its field of view of the room 92 (e.g., in addition to temperature data). In this embodiment, the infrared camera may include an active field, e.g., a CCD or CMOS camera including one or more lenses, filters, and the like (not shown) mounted to the vent 30, e.g., to the frame 32, as shown in FIG. 2A. Thus, the infrared camera 42 may be focused to acquire two dimensional images of the room 92 within its field of view and convert those images into digital or other image signals, which may be communicated to the processor 38.

Depending on the degree of processing desired, the image signals 41T may simply be communicated by the interfaces 40, 56 to the central controller 50, which may analyze or otherwise process the image signals 41T. As described elsewhere herein, in one method, the central controller 50 may analyze the image signals 41T to identify the presence of one or more heat sources within the room 92. This may simply involve identifying light regions within the image signals, e.g., having a size and/or brightness above a predetermined threshold. Optionally, the central controller 50 may analyze the image data to identify specific shapes, e.g., to identify silhouettes of one or more persons within the room 92. The quality of the image data may be used simply as a threshold to determine whether or not the room 92 is occupied, or optionally, to approximate or identify the number of persons within the room 92. Optionally, the central controller 50 may be capable of identifying other heat source of interest, e.g., windows, computers, lights, and the like, which may impact conditioning the room 92, also as described elsewhere herein. Alternatively, instead of an infrared camera, the vent may include a motion sensor (not shown), which may provide data indicating whether a person is present in the room.

In addition, if the central controller 50 determines that a person is present within the room, the central controller 50 may also analyze the image data to approximate the person's location within the room. For example, the central controller 50 may approximate the location of the person based on the location of the identified heat source within the field of the images, e.g., based on an x-y or other coordinate system relative to the images. As described elsewhere herein, such data may be used to direct the orientation of the fins 34 of the respective vent 30, e.g., to direct conditioned air towards the person within the room 92.

Figure 3:
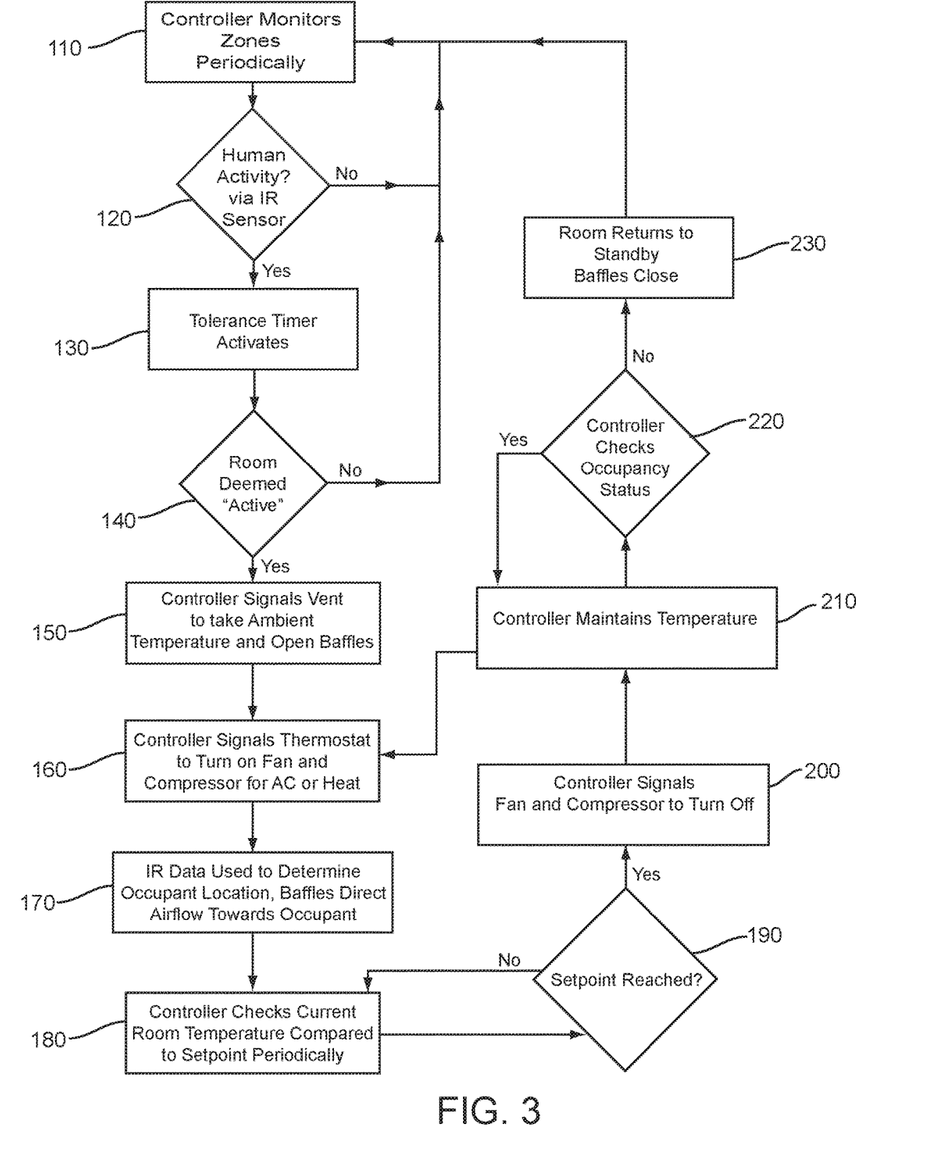
FIG. 3 is a flowchart showing an exemplary method for operating an air conditioning/heating system, such as that shown in FIG. 1.

Turning to FIG. 3 (with additional reference to the exemplary system 10 shown in FIG. 1), an exemplary method is shown for operating a central air system 20 using a plurality of vents 30 mounted within respective rooms 92 of a building 90 serviced by the central air system 20. The method shown in FIG. 3 may be used to selectively deliver conditioned air to one of the rooms 92, and/or the method may be performed simultaneously for all of the rooms 92 within the building 90, e.g., independently of one another.

Initially at step 110, a controller, such as the central controller 50 in FIG. 1, may periodically poll the vent 30 for each room 92. For example, as described above, the processor 38 for each vent 30 may periodically acquire data from the heat sensor 42, e.g., at set periods or when instructed by the central controller 50, which may be communicated to the central controller 50, e.g., via the communication interfaces 40, 56.

At step 120, the central controller 50 may analyze the data to determine whether a person is present within each room 92. For example, the central controller 50 may analyze image data from an infrared camera 42 to determine whether a heat source is present, e.g., by identifying a "hot spot" in the images from the image data. In one embodiment, the central controller 50 may analyze the image data to identify a predetermined heat signature, e.g., corresponding to the shape and/or size of a person, who may be present in the room 92. For example, the central controller 50 may determine whether a heat source detected in the images has a shape that corresponds to a person, rather than to a fixture such as a window, lights, electronic equipment, and the like that may be in the room 92 (permanently or temporarily). In addition or alternatively, the central controller 50 may monitor a heat source detected in the images over a predetermined time period, e.g., to determine whether the heat source has moved in the images, and therefore within the room 92, which may confirm that a person has entered the room 92. Alternatively, if a motion sensor is used instead of a camera, the central controller 50 may receive motion data from the sensor to determine whether a person is in the room 92.

If no heat source or heat signature is detected or no motion is detected ("no" at decision point 120), the central controller 50 may return to step 110 and continue to periodically poll the vents 30.

Optionally, if the central controller 50 determines that no person is present within any of the rooms 92, the central controller 50 may instruct the central air system 20 (or its thermostat 26) to shut the entire central air system 20 off or reduce to minimize activity. For example, the main thermostat 26 of the building 90 may be set at a threshold, e.g., a minimum temperature when heating or a maximum temperature when cooling. Such a threshold may be considered a "stand-by" temperature target for the rooms 92 during unoccupied periods of time. Maintaining such a stand-by temperature may use less energy than attempting to maintain all of the rooms 92 at a desired occupancy temperature. In an exemplary embodiment, when cooling an otherwise warm building, a target occupancy temperature may be seventy degrees (70° F.) while a stand-by temperature may be eighty degrees (80° F.) or eighty five degrees (85° F.).

In addition or alternatively, the central controller 50 may control the central air system 20 and/or vents 30 to maintain the stand-by temperature for unoccupied rooms. For example, if the central thermostat 26 is set at a stand-by temperature, and the central controller 50 determines that an unoccupied room has warmed above the stand-by temperature, the central controller 50 may activate the central air system 20 if shut down and/or open the vent to the excessively warm room to bring the temperature back down to the stand-by temperature.

Returning to FIG. 3, if a heat source or heat signature is detected within a room 92 ("yes" at decision point 120), at step 130, a tolerance timer may be activated, e.g., to confirm the positive detection (i.e., that a person is present) and reduce the risk of false positives. For example, the central controller 50 may continue to monitor image data from the vent 30 corresponding to the room 92 with the positive detection, e.g., at the same rate or at a faster rate than previously obtained.

At step 140, after the tolerance time has elapsed, the central controller 50 may determine whether the room is, in fact, occupied. If the decision is "no" (no person present), the central controller 50 may reset and return to step 110. If the central controller 50 confirms that a person is present within the room ("yes" at decision point 140), the central controller 50 may open the vent 30 for the occupied room 92 and deliver conditioned air, e.g., using steps 150-190.

For example, initially at step 150, the central controller 50 may instruct the processor 38 for the vent 30 to acquire the current temperature of the occupied room 92. In addition, the central controller 50 may automatically instruct the processor 38 to open the fins 34 of the vent 30 and begin delivery of conditioned air. Alternatively, the central controller 50 may leave the vent 30 closed until the processor 38 transmits the temperature data. The central controller 50 may then compare the temperature data with the desired occupancy temperature for the room 92. For example, the central controller 50 may have a database in memory 54 that includes default desired occupancy temperatures (e.g., a minimum temperature for heating and/or a maximum temperature for cooling), and override desired occupancy temperatures, if any, for individual or groups of rooms. For example, the desired occupancy temperatures for individual or groups of rooms may be entered and/or stored in the memory 54 of the central controller 50 by a user, e.g., using the electronic device 60 and/or other control interface (not shown) for the system 10.

If the current temperature of the room 92 falls within the desired occupancy temperature for the room, the central controller 50 may keep the vent 30 closed and/or the central air system 20 off (if not on for delivering air to other rooms).

At step 160, when the current temperature is outside the desired occupancy temperature, the central controller 50 may communicate with the central thermostat 26 and/or directly with the central air system 20 to turn the central air system 20 on (if otherwise off), and/or open the vent 30 to deliver air into the room 92.

Optionally, at step 170, the central controller 50 may determine the location of the heat source or heat signature in the images of the image data and use this information to approximate the location of the person within the room 92. The central controller 50 may then instruct the processor 38 of the vent 30 to actuate the motor(s) 36 to move the fins 34, e.g., to direct the delivered air towards the person. The central controller 50 may continue to monitor the location of the heat source or heat signature in the images and adjust the configuration of the fins 34 to continue to direct the air towards the person. If the central controller 50 determines that multiple persons are in the room 92, the central controller 50 may use an average location between the persons as the target direction for the delivered air or other algorithm to determine the direction for the delivered air.

Such dynamic directional delivery of air may be maintained for the entire time that the person(s) are within the room. Alternatively, such directional flow may be maintained only while the current temperature within the room is outside the desired occupancy temperature by a predetermined threshold. For example, if a person enters a room that is excessively warm, the central controller 50 may direct the conditioned air towards the person to provide localized cooling while the average temperature of the room is reduced. Once the temperature is reduced below the threshold, e.g., sufficiently close the desired occupancy temperature, then the air may be directed generally into the room, away from the person (e.g., to prevent excessive localized cooling), and the like, as desired.

At step 180, the central controller 50 may continue to monitor the current temperature of the room 92, e.g., by periodically polling the processor 38 to acquire temperature data from the heat sensor 42. At step 190, if the central controller 50 confirms that the current temperature remains outside the desired occupancy temperature, e.g., is too warm or too cold ("no" at decision point 190), the central controller 50 may return to step 180 and continue delivery of air.

If at step 190, the central controller 50 determines that the current temperature has fallen within the desired occupancy temperature ("yes" at setpoint reached in step 190), the central controller 50 may close the vent 30 at step 200 and/or shut off the central air system 20 (e.g., if not being otherwise used to deliver air to other rooms) to temporarily discontinue delivery of air to the room 92.

At steps 210 and 220, the central controller 50 may operate the system 10 as necessary to maintain the temperature of the room 92 within the desired occupancy temperatures. For example, the central controller 50 may periodically request temperature data to determine whether the current temperature has fallen outside the desired occupancy temperature. If so, the method may return to step 160, e.g., turning the central air system 20 back on and/or opening the vent 30. If not, the central air system 20 may remain off and/or the vent 30 closed.

In addition, at step 220, the central controller 50 may also continue to periodically monitor that the person(s) remains within the room 92. If the person(s) leaves the room 92 ("no" at decision point 220), the central controller 50 may close the vent 30 and/or return the room 92 to stand-by status, e.g., to maintain the room 92 within the stand-by temperatures, as described elsewhere herein. Optionally, when the person(s) leaves the room 92, the central controller 50 may defer action for a predetermined time, e.g., to confirm that the room 92 remains unoccupied for a predetermined threshold, e.g., on the order of several minutes, to confirm that the person(s) did not temporarily leave the room 92 and then return. Finally, at step 230, the central controller 50 may return to step 110, i.e., periodically monitoring the room 92 to determine whether a person once enters it.

Optionally, when the person leaves the room, the central controller 50 may predict where the person is going within the building. For example, based on certain times of day, the central controller 50 may know that certain rooms are likely to be occupied, and so when a person leaves one of those rooms, the central controller 50 may deliver air to another nearby room likely to be the destination. Alternatively, the central controller 50 may increase the rate at which the vents 30 of nearby rooms are polled, e.g., to quickly detect whether the person has entered one of the nearby rooms 92.

Optionally, a user, e.g., owner, occupant, or manager of a building 90 and/or rooms 92 serviced by a central air system, such as the system 10 of FIG. 1 may be able to control and/or modify operation of the system.

For example, turning to FIGS. 4A-4H, exemplary screen shots are shown from an application that may be used to operate and/or monitor an air conditioning/heating system, such as the system 10 of FIG. 1. The application may be a software and/or hardware implemented computer program product that may be downloaded and/or otherwise saved on a remote and/or portable electronic device, such as the electronic device 60 shown in FIG. 1. Alternatively, the application may be provided on an electronic device (not shown) permanently within the building 90, e.g., on a control panel located at a convenient location, e.g., adjacent the thermostat 26, a computer, and the like.

Generally, the portable electronic device 60 may be an electronic and/or computing device, such as a tablet computer, a mobile, smart, and/or cellular telephone, a personal digital assistant, a wi-fi device, a desktop computer, a laptop computer, and the like, capable of communicating via the network 70. In an exemplary embodiment, the electronic device 60 may be a portable or mobile device including one or more processors, memory and/or other storage devices, communication interfaces, and/or user interfaces (not shown), as described further below. In exemplary embodiments, the user interface may be a touchscreen, a keyboard, and the like, which may be used to navigate through the menus and/or pages of the application. The communications interface may include an interface for communicating locally, e.g., a Bluetooth or other short range RF transceiver, a cellular communications interface, and the like.

In exemplary embodiments, the network 10 may be a telecommunications network, including a wide area network ("WAN"), a local area network ("LAN"), an intranet, a wireless network, and/or a telephony network. For example, the network 70 may incorporate several different types of networks including a WAN, a LAN, and/or a wireless network; one such network including multiple different types of networks is the Internet.

Figure 4A:
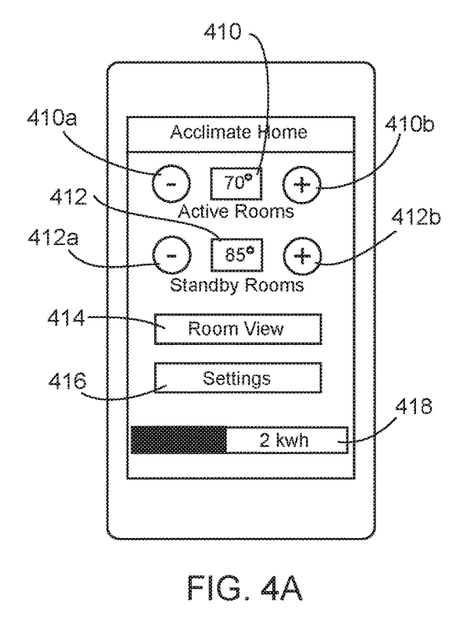
FIGS. 4A-4H are screen shots from an exemplary embodiment of an application for a remote and/or wireless device that may communicate with an air conditioning/heating system, such as that shown in FIG. 1.

Initially, when the application is launched a default image or page may be presented on the electronic device's display, such as the "home" page shown in FIG. 4A. In this embodiment, the home page may include fields displaying the default settings, e.g., a desired occupancy temperature field 410, and a desired stand-by temperature 412. The data may stored locally in memory of the electronic device 60, or the electronic device 60 may communicate with the central controller 50, e.g., to obtain the settings from the database in the controller's memory 54.

For example, as shown in FIG. 4A, the desired occupancy temperature (for occupied rooms) may be seventy degrees (70° F.) and the desired stand-by temperature (for unoccupied rooms) may be eight five degrees (85° F.). Also as shown, the page may also include an interface, e.g., a touch screen for changing the default settings. For example, "−" and "+" buttons or icons 410a, 410b may be provided on either side of the desired occupancy temperature field 410, and "−" and "+" buttons or icons 412a, 412b may be provided on either side of the stand-by temperature field 412. Thus, the user may simply select the "−" or "+" to change the target temperatures. Once desired changes are set, the user may select an "Update" or other button or icon (not shown), and the changes may be communicated to the central controller 50, which may update the database accordingly.

Optionally, the home page may also include other fields and/or buttons or icons. For example, as shown in FIG. 4A, the home page may include buttons or icons, namely "Room View" icon 412, "Settings" icon 414, and "2 kWH" icon 416.

Figure 4B:
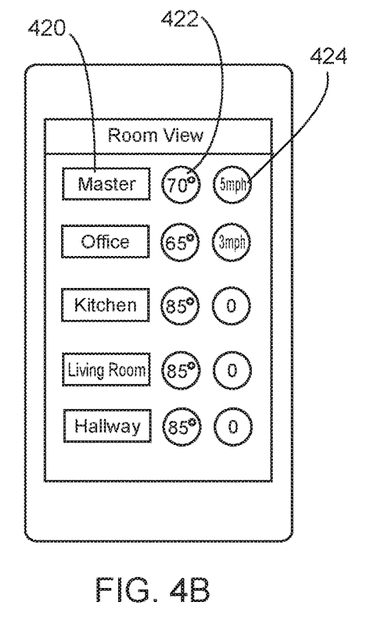

If the user selects the "Room View" icon 412, a new image or "room view" page, such as that shown in FIG. 4B, may be presented on the electronic device's display. As shown, the room view page may include a column 420 listing the vents included in the system, e.g., identified or labeled by their respective room, e.g., master (bedroom), office, kitchen, living room, hallway, and the like. In addition, the room view page may also include relevant information for each of the identified vents/rooms. For example, as shown, a first column 422 may be presented that indicates the "current temperature" within each of the rooms, and a second column 424 may be presented that indicates "velocity" (e.g., in mph) or "volume" (e.g., in cfm) of air being delivered into each of the rooms. For example, a flow sensor (not shown) may be provided in each vent 30 that may provide such data to the central controller 50. In addition or alternatively, other information may be provided, such as the override default temperature for each room (e.g., if different than the main default temperature for the overall system), current status (e.g., whether occupied and active or unoccupied and on stand-by).

Optionally, one or more of the fields may be active, i.e., may include buttons or icons that may be selected, e.g., to monitor and/or change parameters for the different vents/rooms. For example, by selecting one of the rooms, an image or page similar to the home page of FIG. 4A may be presented including the default temperatures for the selected room (not shown). The user may be able to change the default temperatures, e.g., using "−" or "+" buttons, similar to the method used for FIG. 4A. When the user is finished reviewing or modifying the parameters for the selected room, a "Done" button or icon may be selected, e.g., to return the user to the room view page of FIG. 4B, and communicate the changes to the central controller 50. The room view page itself may also include a "Done" or "Back" button or icon (not shown), e.g., to return to the home page, and/or other menus may be presented on the display to access other images or pages directly (also not shown).

Returning to FIG. 4A, the "2 kwh" field 418 may provide the user with a representation of their current energy consumption (e.g., a consumption value, which may different than the "2 kwh" rate shown as an example in FIG. 4A). For example, the field may include a running total of energy consumed, a current rate of energy consumption, and the like. The field may be updated by periodically communicating with the central controller 50, e.g., inquiring for energy consumption data that may be maintained by the central controller 50 in its memory 54.

Figure 4C:
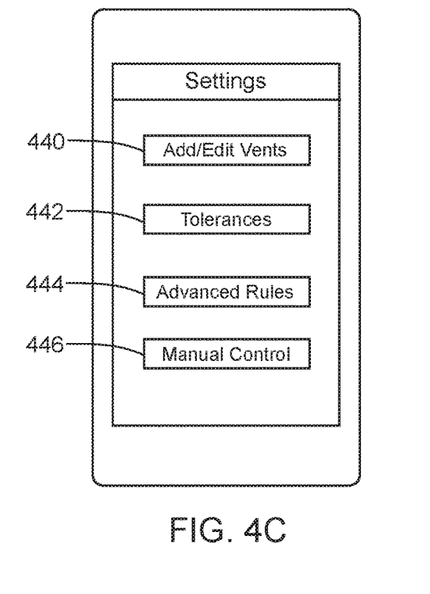
Figure 4D:
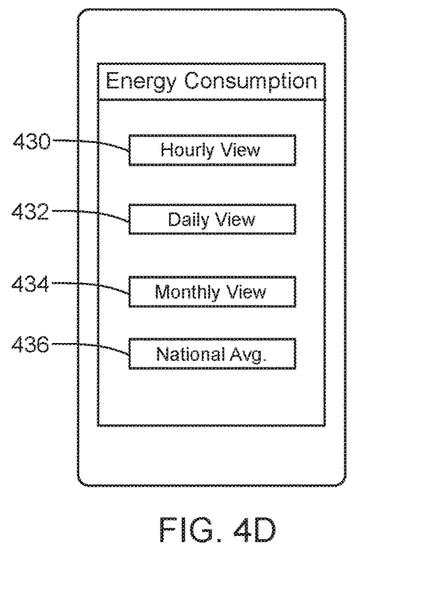

Optionally, the user may select the "2 kwh" icon 418, and another image or "energy consumption" page may be presented on the display, such as that shown in FIG. 4D. This page may provide the user with a menu of energy consumption information that may be presented, e.g., on the energy consumption page itself, or within the "2 kwh" field 418 in FIG. 4A. For example, the user may be able to select an Hourly View 430 showing their most recent hour's energy consumption, a Daily View 432 showing their most recent day's energy consumption, a Monthly View 434, or a National Average View 436. Optionally, the values for each of these options may also be presented on the energy consumption page, in addition to the menu headings shown. The energy consumption page may also include a "Done" or "Back" icon or a menu for returning to FIG. 4A or turning to another page available in the application.

Returning again to FIG. 4A, if the user selects the "Settings" icon 416, a new image or "settings" page may be presented on the display, such as that shown in FIG. 4C. The settings page may include a menu of setting parameters, e.g., active fields, buttons, or icons, which the user may select to monitor or change one or more settings for the system.

Figure 4E:
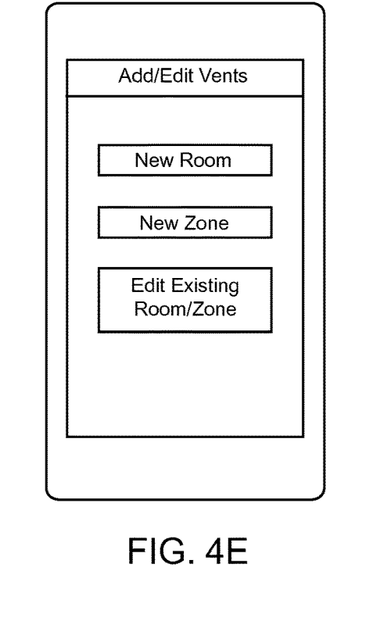

For example, if the user selects the "Add/Edit Vent" field 440 in FIG. 4C, an image or page such as that shown in FIG. 4E may be presented on the display. The user may then select one of the options on the Add/Edit menu, e.g., to add a new room or zone, or edit an existing room or zone. Once the user has entered any changes, the user may select a "Done" button and return to the main setting page, and the changes may be communicated to the central controller 50. In the case of adding a new vent, the central controller 50 may include software programs that may contact the vent and configure it for addition to the system.

Figure 4F:
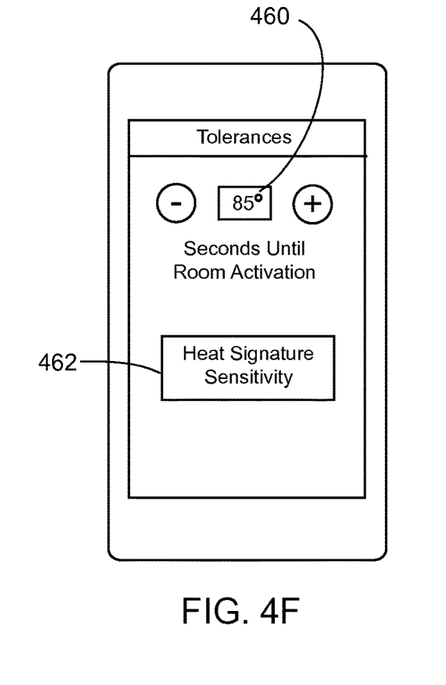

If the user selects the "Tolerances" field 442 in FIG. 4C, an image or page such as that shown in FIG. 4F may be presented on the display. On this page, the user may be able to change tolerances of the system. For example, the user may select the "−" or "+" buttons adjacent the "Seconds Until Room Activation" field 410 to increase or decrease the time before the central controller 50 turns on the central air system 20 and/or opens a vent 30 for a room upon detecting a person present within the room, e.g., as described above at steps 120-140 of the method of FIG. 3. Thus, if the user finds people moving frequently between rooms and activating the central air system 20 prematurely, the tolerance may be extended to a longer time, such that the central controller 50 takes longer to confirm that a room is in fact occupied before activating the system.

In addition, the user may be able to select the "Heat Signature Sensitivity" field 470, e.g., to increase or decrease the sensitivity of the central controller 50 in detecting a heat source or heat signature in images from the different vents. Once any changes are made, the user may again select a "Done" icon and return to the main settings page, and the electronic device 60 may communicate the changes to the central controller 50 to update the database in memory 54.

Figure 4G:
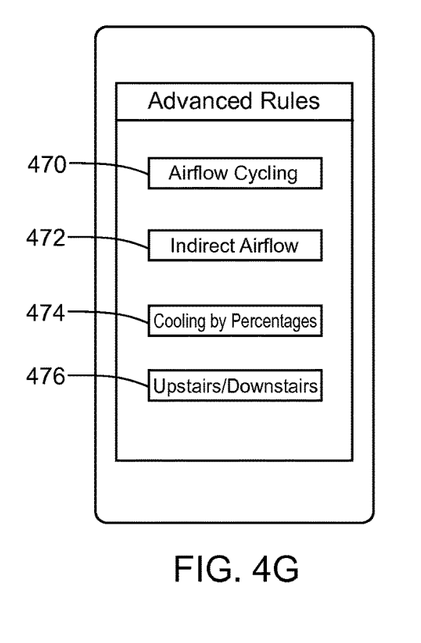
Figure 4H:
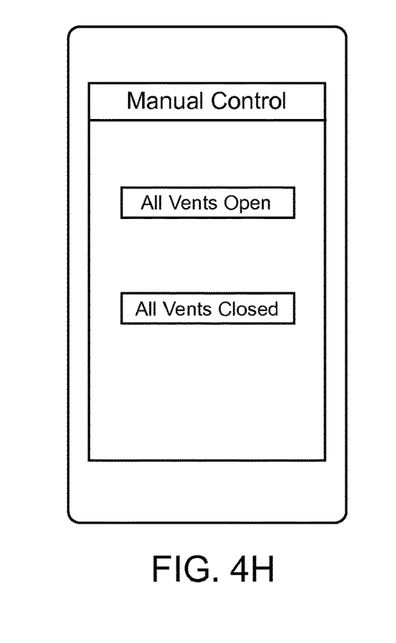

If the user selects the "Advanced Rules" field 444 in FIG. 4C, a new image or page may be presented on the display, such as that shown in FIG. 4G. On this page, a menu of global system operations may be presented, allowing the user to change other operating parameters of the system. For example, if the user selects the "Airflow Cycling" field 470, the user may indicate one or more rooms where it is desired that the air be delivered in a cycled pattern into the room. For example, when selected, the central controller 50 may actuate the fins of any identified vents 30 in a predetermined manner when they deliver air, e.g., moving vertical and/or horizontal fins back and forth in a repeated pattern. For example, in some rooms, it may be desirable to have the direction of air flow change substantially continuously, rather than remaining stationary or focusing the air towards a person who enters the rom. Similarly, if the user selects the "Indirect Airflow" field 472, the user may indicate one or more rooms where it is desired that airflow not be directed towards a person in the room. For example, this setting may be used to direct flow away from a person sorting papers or documents. When selected, the central controller 50 may identify the location of the person using the image data for the associated vent, and actuate the fins to direct the air into the room offset from the location of the person.

Further, if the user selects the "Cooling By Percentages" field 474, the user may be able to manually override the default operation of the central controller 50 and direct airflow to one or more rooms. For example, the user may set one hundred percent (100%) flow to the family room while company is over, and twenty percent (20%) flow to the rest of the bedrooms to keep them comfortable, whereupon the central controller 50 may open and/or close the vents 30 to achieve the desired air delivery configuration. If the user wishes to go into a room that has previously been shut off to all AC and is now warmer than usual, the user may momentarily shut off the rest of the house to rapidly bring the new room down to the desired temperature relatively quickly.

Finally, if the user selects the "Upstairs/Downstairs" field 476, the user may be able to globally adjust delivery of conditioned air to multiple zones within the building. For example, at night, bedrooms that are "Upstairs" may still need air, while living spaces "Downstairs" may not. By selecting the "Upstairs" option, the user may direct air to the rooms where persons are sleeping and away from unused living spaces. Conversely, by selecting the "Downstairs" option, the user may direct air to living spaces and away from unoccupied bedrooms, e.g., during the day.

Optionally, if the vents 30 include one or more additional sensors 44, the processor 38 for each vent 30 may communicate data from the sensor(s) to the central controller 50 for performing additional functions. For example, a multi-purpose sensor may be provided that is capable of detecting smoke, carbon monoxide, or other hazardous materials. If the central controller 50 detects the presence of such materials based on data from the sensor 44, the central controller 50 may close the fins 34 for the vent 30, e.g., to prevent air delivery into a room, which may otherwise fuel a fire, and/or prevent the materials from traveling to other rooms through the ducts 24. In addition, the central controller 50 may perform other functions, e.g., automatically contact emergency personnel, activate an alarm or other indicators in the building 90, and the like.

It will be appreciated that elements or components shown with any embodiment herein are exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A system for operating a central air system within a building that includes one or more blowers and ducts communicating from the one or more blowers to rooms within the building, the system comprising:
 a vent in each of the rooms comprising first and second sets of fins movable independently about first and second axes, respectively, and an actuator coupled to the first and second sets of fins for selectively opening and closing the respective vent and controlling directional flow of air from the central air system through the respective vent;
 an infrared thermal camera mounted to each vent;
 a processor mounted to each vent and coupled to the camera of each vent to acquire heat signature data to detect and locate occupants within the respective room, the processor communicating with the actuator of the respective vent for directing the actuator to open or close the first and second sets of fins of the respective vent based at least in part on the heat signature data and to provide directional flow of air through the respective vent into the respective room;
 a controller remote from and communicating with each vent, wherein the controller is configured to determine whether each of the rooms is occupied based on communications from the processor of each vent, the controller configured to selectively open each vent when the respective room is occupied based on the communications from the processor of each vent to maintain a desired occupancy temperature within the respective room, the controller further configured to selectively close each vent when the respective room is unoccupied to maintain a stand-by temperature that is higher than the desired occupancy temperature; and
 a vent communication interface mounted to each vent for wireless communication with the controller, and wherein the controller is further configured to process heat signature data from the camera of each vent to determine when an occupant in an occupied room of the rooms is leaving the occupied room, the controller is further configured to predict a destination room of the rooms, the destination room being where the occupant is predicted to go within the building when leaving the occupied room and the controller is further configured to actuate the vent in the destination room and the vent in at least one additional room of the rooms,
 wherein the controller is further configured to actuate the vent in the destination room and the vent in the at least one additional room to increase a rate at which the vent of the at least one additional room and the vent of the destination room are polled to acquire temperature data to detect whether the occupant has entered the destination room.

2. The system of claim 1, wherein the controller is further configured to compare the heat signature data to a predetermined threshold to confirm when the occupant is in the occupied room, the processor configured to open the respective vent when the heat signature confirms that the occupant is in the occupied room.

3. The system of claim 2, wherein the controller is further configured to determine a location of a heat signature in the heat signature data and correlate the location to a location within the occupied room where the occupant is, the processor configured to actuate the first and second sets of fins of the respective vent to direct air delivered from the respective vent towards the location within the occupied room.

4. The system of claim 1, wherein the controller is further configured to analyze the heat signature data to determine a current temperature within each of the rooms, the system further comprising a database including the stand-by temperature for unoccupied rooms and the desired occupancy temperature for occupied rooms, the processor configured to open and close the vent to deliver air to maintain the current temperature within the respective room at the desired occupancy temperature if the processor determines the respective room is occupied and to maintain the current temperature at the stand-by temperature if the processor determines the respective room is unoccupied.

5. The system of claim 1, wherein the controller is further configured to determine when a room status changes from unoccupied to occupied based on heat signature data from the respective infrared thermal camera on the respective vent in the respective room, the controller further configured to actuate the respective vent to direct conditioned air towards the occupant of the respective room until one or more sensors associated with the respective vent confirm the respective room reaches the desired occupancy temperature for the respective room, whereupon the controller actuates the respective vent to close the respective vent or shut off the central air system to temporarily discontinue delivery of air to the respective room.

6. The system of claim 1, wherein the processor further is configured to analyze the heat signature data to simultaneously acquire temperatures for several locations within the respective room and combining or averaging the acquired temperatures to determine a current temperature within the respective room, the processor configured to direct the actuator to control the first and second sets of fins of the respective vent based at least in part on the current temperature.

7. The system of claim 3, wherein the processor is further configured to analyze the heat signature data to determine when a temperature within the respective room reaches a predetermined threshold temperature, and wherein, when the predetermined threshold temperature is reached, the processor is configured to actuate the first and second sets of fins of the respective vent to redirect the respective vent away from the approximate location and into the respective room to continue delivering air into the respective room while preventing excessive localized cooling of the occupant at the approximate location.

8. The system of claim 1, wherein the first set of fins is movable about a vertical axis, and the second set of fins is movable about a horizontal axis.

* * * * *